Patented Aug. 6, 1935

2,010,619

UNITED STATES PATENT OFFICE 2,010,619

METHOD OF COLORING GOB

Stephen G. Wright, Chicago, Ill.

No Drawing. Application November 3, 1933,
Serial No. 696,599

6 Claims. (Cl. 91—70)

This invention relates to a method for coloring gob.

In the preparation of composition shingles, it is common to apply a coating of granules made from rock material of various types. It has heretofore been proposed to use for this purpose what is known in the industry as gob. Gob is refuse rock, mostly shale, from coal mines, which has stood in the dumps for a considerable period. Such rock dumps ignite spontaneously and burn for considerable periods. The gob has a dull reddish color which itself is undesirable for roofing, and hitherto proposed methods for producing artificial coloring from this material have been mainly confined to glazing.

It has now been discovered that a satisfactorily colored gob may be produced without glazing. In accordance with this invention, the gob is ground, preferably to pass a 10-mesh screen and be caught upon a 30-mesh screen, and a pigment is then glued to the gob particles. This gluing is preferably accomplished by the use of a water solution of sodium silicate which is used as a binder to combine the gob and the pigment. In general it is preferred to admix the pigment with the water solution rather than to wet a mixture of gob and pigment. The amount of sodium silicate is controlled in accordance with the absorptiveness of the rock, and is in all cases kept low enough so that the surface of the colored rock presents a matte finish and there is no indication of a glassy or glazed surface. Apparently substantially all of the sodium silicate is absorbed by the rock or pigment except that gluing the material on.

A preferred pigment is red oxide of iron. For example, with gob of the size indicated hereinabove, iron oxide ground to pass 200-mesh screens is satisfactory.

After the oxide has been glued to the gob, the mass is dried and then heated to about 1450°–1650°, preferably at a temperature of the order of 1550° F. for a short period, for example two minutes. The temperature chosen should be high enough so that upon soaking the product in water the water tests neutral, and the temperature should be low enough so that the pigment is not adversely affected. This treatment permanently attaches the pigment to the gob and produces an extremely satisfactory color. No glaze is produced, the pigment particles simply being stuck to the gob particles in a heterogeneous fashion. The color effect produced is quite homogeneous, however.

As an example of the process, one ton of gob granules ground to pass a 10-mesh and be caught upon a 30-mesh screen are treated with 100 lbs. of commercial sodium silicate (40° Bé.) dissolved in 100 lbs. of water, and with 18 lbs. of red oxide of iron ground to pass through a 200-mesh screen. The materials are mixed, dried, and then heated at 1550° for about 2 minutes in a rotary kiln. Longer heating periods may be used if desired.

Fractional amounts of iron sulphate or pickling liquor from the steel mills may be added if desired. It is preferred to carry out the heating operation in a rotary kiln. The particles are not detached by such treatment.

The process is applicable to equivalents of gob, for example other rock material such as rhyolite. With a relatively non-absorbent rock, such as rhyolite, the amount of sodium silicate is greatly reduced. A preferred proportion is 1 part sodium silicate, 2 parts water and 100 parts rhyolite.

Other glues may be used in place of the sodium silicate, and other pigments, such as chrome oxide or the like, may be used in place of the iron oxide.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. The method of treating crushed rock to provide a permanent matte coloring therefore which comprises coating said rock with a suspension of pigment in a solution of sodium silicate, the amount of silicate being so low as not to produce any substantial visible glaze and ranging from 1% by weight of a non-absorbent rock such as rhyolite to 5% by weight of an absorbent rock such as gob, and baking the mass, whereby a colored matte finish with substantially no visible glaze is produced.

2. The method as set forth in claim 1 in which the rock is gob.

3. The method as set forth in claim 1 in which the baking is carried out at a temperature of the order of 1450–1650° F.

4. As an article of manufacture, crushed rock particles having permanently bound thereto a baked matte coating of a pigment, the binding agent being initially sodium silicate, and the proportion thereof being so low as to produce a matte finish with substantially no visible glaze and ranging from approximately 1% by weight of a non-absorbent rock such as rhyolite to approximately 5% by weight of an absorbent rock such as gob.

5. An article as set forth in claim 4 in which the rock is gob.

6. An article as set forth in claim 4 in which the rock is gob, and the pigment is iron oxide.

STEPHEN G. WRIGHT.